(12) United States Patent
Luo et al.

(10) Patent No.: US 10,631,376 B2
(45) Date of Patent: Apr. 21, 2020

(54) HIGH BRIGHTNESS LED MATRIX DRIVING SYSTEM

(71) Applicant: Monolithic Power Systems, Inc., San Jose, CA (US)

(72) Inventors: Zheng Luo, San Jose, CA (US); Junjian Zhao, San Jose, CA (US); Chao Liu, Sunnyvale, CA (US); Tong Chen, San Jose, CA (US); Yu-Huei Lee, New Taipei (CN)

(73) Assignee: Monolithic Power Systems, Inc., San Jose, CA (US)

( * ) Notice: Subject to any disclaimer, the term of this patent is extended or adjusted under 35 U.S.C. 154(b) by 83 days.

(21) Appl. No.: 15/883,494

(22) Filed: Jan. 30, 2018

(65) Prior Publication Data
US 2019/0239302 A1    Aug. 1, 2019

(51) Int. Cl.
*H05B 33/08*     (2020.01)

(52) U.S. Cl.
CPC ..... *H05B 33/0845* (2013.01); *H05B 33/0824* (2013.01)

(58) Field of Classification Search
None
See application file for complete search history.

(56) References Cited

U.S. PATENT DOCUMENTS

| 2010/0156317 | A1* | 6/2010 | Arai | G09G 3/342 |
| | | | | 315/294 |
| 2010/0295861 | A1* | 11/2010 | Somerville | G09G 3/3216 |
| | | | | 345/545 |
| 2011/0109670 | A1* | 5/2011 | Sempel | G09G 3/3241 |
| | | | | 345/692 |
| 2017/0330509 | A1* | 11/2017 | Cok | G09G 3/2014 |
| 2018/0090048 | A1* | 3/2018 | Tang | G09G 3/2018 |

* cited by examiner

*Primary Examiner* — Jimmy T Vu
*Assistant Examiner* — Laura Yesildag
(74) *Attorney, Agent, or Firm* — Perkins Coie LLP (57) ABSTRACT

A LED driving system for a LED matrix having a plurality of LEDs connected in parallel. The LED driving system includes a plurality of driving modules. Each one of the plurality of driving modules drives a corresponding one of the plurality of LEDs. The plurality of LEDs are divided into a plurality of groups. The plurality of driving modules drive the plurality of LEDs ON successively group by group. In each one of the plurality of groups, the LESs are driven ON successively row by row, and for each row in each one of the plurality of groups, the LEDs are driven ON successively column by column with a programmed delay time between the LEDs in every two successive columns. Each one of the plurality of driving modules can include a grayscale control module for adjusting a brightness of the corresponding one of the plurality of LEDs.

8 Claims, 4 Drawing Sheets

HIGH BRIGHTNESS LED MATRIX DRIVING SYSTEM

TECHNICAL FIELD

This disclosure relates generally to light emitting diode ("LED") drivers, and more particularly but not exclusively relates to driving circuits of LED matrix.

BACKGROUND

Large matrix of high-brightness light emitting diodes ("LEDs") is more and more popular in applications such as highly pixilated light sources, high brightness LED matrix displays and automotive LED headlight systems etc. Fast and efficient driving control to such LED matrix with smart brightness adjusting and high brightness uniformity regulation is desired.

SUMMARY

In accomplishing the above and other objects, there has been provided, in accordance with an embodiment of the present disclosure, grayscale control module for adjusting a brightness of a LED, comprising: a Q-bit input terminal configured to receive a programmed grayscale command value comprising Q bits, wherein Q is an integer greater than 0 and the programmed grayscale command value ranges from 0 to $2^Q$; and wherein the LED grayscale control module is configured to adjust the brightness of the LED using Q-bit grayscale command providing $2^Q$ grayscale adjusting steps, and wherein the brightness of the LED is determined by a ratio of the programmed grayscale command value to $2^Q$.

In addition, there has been provided, in accordance with an embodiment of the present disclosure, a LED driving system for a LED matrix having a plurality of LEDs connected in parallel, comprising: a plurality of driving modules, wherein each one of the plurality of driving modules is configured to drive a corresponding one of the plurality of LEDs; and wherein the plurality of LEDs in the LED matrix are divided into a plurality of groups; and wherein the plurality of driving modules are configured to drive the plurality of LEDs ON successively group by group, and wherein for each one of the plurality of groups, the plurality of driving modules are configured to drive the LESs ON successively row by row, and wherein for each row in each one of the plurality of groups, the plurality of driving modules are configured to drive the LEDs ON successively column by column with a programmed delay time between the LEDs in every two successive columns.

wherein each one of the plurality of driving modules is configured to adjust a brightness of the corresponding one LED using Q-bit grayscale command providing $2^Q$ grayscale adjusting steps, and wherein the brightness of the corresponding one LED is determined by a ratio of a programmed grayscale command value for the corresponding one LED to $2^Q$, and wherein Q is an integer greater than 0, and wherein the programmed grayscale command value ranges from 0 to $2^Q$.

There has also been provided, in accordance with an embodiment of the present disclosure, a LED driving system for a LED matrix of M rows and N columns including a set of LEDs {LED(c, r), c=0, 1, ..., N−1, r=0, 1, ..., M−1} connected in parallel, comprising: M products N driving modules {DRV(c, r), c=0, 1, ..., N−1, r=0, 1, ..., M−1}, wherein M and N are integers greater than 1, and wherein the DRV(c, r) is configured to drive the LED(c, r) in the $c^{th}$ column and $r^{th}$ row of the LED matrix for each c=0, 1, ..., N−1 and r=0, 1, ..., M−1; and wherein the set of LEDs {LED(c, r), c=0, 1, ..., N−1, r=0, 1, ..., M−1} are divided into G groups by row, wherein G is an integer greater than 2 and smaller than M; and wherein the M products N driving modules {DRV(c, r), c=0, 1, ..., N−1, r=0, 1, ..., M−1} are configured to drive the G groups of LEDs ON successively group by group; and wherein for each one of the G groups, the M products N driving modules {DRV(c, r), c=0, 1, ..., N−1, r=0, 1, ..., M−1} are configured to drive the LESs ON successively row by row, and wherein for each row r in each one of the G groups, the DRV(c+1, r) is configured to drive the LED(c+1, r) ON after the DRV(c, r) has driven the LED(c, r) ON for a programmed delay time.

for each c=0, 1, ..., N−1 and r=0, 1, ..., M−1, the DRV(c, r) is further configured to adjust a brightness of the LED(c, r) using Q-bit grayscale command providing $2^Q$ grayscale adjusting steps, wherein the brightness of the LED(c, r) is determined by a ratio of a programmed grayscale command value for the LED(c, r) to $2^Q$, and wherein Q is an integer greater than 0, and wherein the programmed grayscale command value for the LED(c, r) ranges from 0 to $2^Q$.

BRIEF DESCRIPTION OF THE DRAWINGS

The following detailed description of various embodiments of the present invention can best be understood when read in conjunction with the following drawings, in which the features are not necessarily drawn to scale but rather are drawn as to best illustrate the pertinent features.

DETAILED DESCRIPTION

Various embodiments of the present invention will now be described. In the following description, some specific details, such as example circuits and example values for these circuit components, are included to provide a thorough understanding of embodiments. One skilled in the relevant art will recognize, however, that the present invention can be practiced without one or more specific details, or with other methods, components, materials, etc. In other instances, well-known structures, materials, processes or operations are not shown or described in detail to avoid obscuring aspects of the present invention.

Throughout the specification and claims, the term "coupled," as used herein, is defined as directly or indirectly connected in an electrical or non-electrical manner. The terms "a," "an," and "the" include plural reference, and the term "in" includes "in" and "on". The phrase "in one embodiment," as used herein does not necessarily refer to the same embodiment, although it may. The term "or" is an inclusive "or" operator, and is equivalent to the term "and/or" herein, unless the context clearly dictates otherwise. The term "based on" is not exclusive and allows for being based on additional factors not described, unless the context clearly dictates otherwise. The term "circuit" means at least either a single component or a multiplicity of components, either active and/or passive, that are coupled together to provide a desired function. The term "signal" means at least one current, voltage, charge, temperature, data, or other signal. Those skilled in the art should understand that the meanings of the terms identified above do not necessarily limit the terms, but merely provide illustrative examples for the terms.

Figure 1:
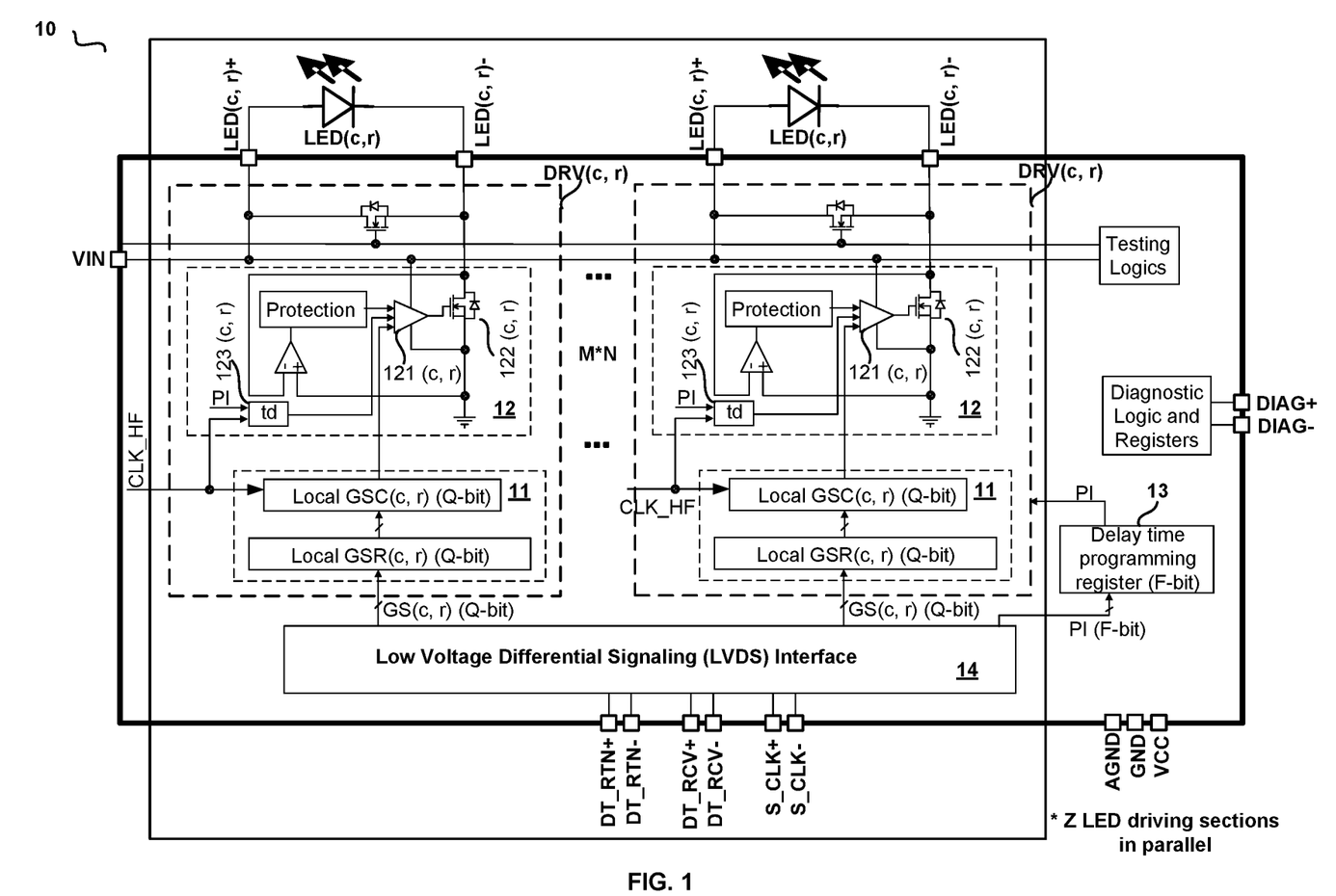
FIG. 1 illustrates a block diagram of a LED matrix driving system 10 in accordance with an embodiment of the present invention.

FIG. 1 illustrates a block diagram of a LED matrix driving system 10 in accordance with an embodiment of the present invention. The LED matrix driving system 10 is provided to drive a LED matrix including a plurality of LEDs connected in parallel and arranged in a LED matrix of M rows and N columns, expressed by {LED(c, r), c=0, 1, . . . , N−1, r=0, 1, . . . , M−1}, wherein M and N are integers greater than 1. Each one LED, e.g. the LED(c, r) in the $c^{th}$ column and $r^{th}$ row in the LED matrix may be connected between a LED positive port LED(c, r)+ and a LED negative port LED(c, r)−, wherein c is an integer ranging from 0 to N−1, and r is an integer ranging from 0 to M−1. The LED matrix driving system 10 may comprise a corresponding plurality of driving modules, wherein each one of the corresponding plurality of driving modules is configured to drive a corresponding one of the plurality of LEDs and to adjust the brightness/flux of the corresponding one LED using Q-bit grayscale command ("GS"), wherein Q is an integer greater than 0.

That is to say, for the LED matrix of M rows and N columns, the LED matrix driving system 10 may comprise M products N driving modules, expressed by {DRV(c, r), c=0, 1, . . . , N−1, r=0, 1, . . . , M−1}. For each c=0, 1, . . . , N−1 and r=0, 1, . . . , M−1, each one of the M products N driving modules, e.g. the DRV(c, r) is configured to drive the corresponding one LED(c, r) and to adjust the brightness/flux of the corresponding one LED(c, r) using Q-bit grayscale command comprising Q bits. In this manner, for each one LED(c, r) in the LED matrix, the Q-bit grayscale command can provide $2^Q$ grayscale adjusting steps, respectively indicative of 0% to 100% brightness of the LED(c, r). For instance, for the LED(c, r) in the $c^{th}$ column and $r^{th}$ row, the adjusted brightness in percentage may be expressed by the following equation (1):

$$\text{Brightness of LED}(c,r) \text{ in percentage} = GS(c,r)/2^Q * 100\% \quad (1)$$

In the above equation (1), the parameter GS(c, r) is a programmed grayscale command value for the LED(c, r) provided to the corresponding one LED driving module DRV(c, r) for the LED(c, r). The programmed grayscale command value GS(c, r) may range from 0 to $2^Q$. Therefore, the brightness of the LED(c, r) in the $c^{th}$ column and $r^{th}$ row may be determined by a ratio of the programmed grayscale command value GS(c, r) for the LED(c, r) to $2^Q$.

In accordance with an embodiment of the present invention, the plurality of LEDs {LED(c, r), c=0, 1, . . . , N−1, r=0, 1, . . . , M−1} in the LED matrix are divided into a plurality of groups. The plurality of driving modules are configured to drive the plurality of LEDs ON successively group by group. For each one of the plurality of groups, the plurality of driving modules are configured to drive the LESs in each one of the groups ON successively row by row. And for each row in each one of the plurality of groups, the plurality of driving modules are configured to drive the LEDs in each row ON successively column by column with a programmed delay time td between the LEDs in every two successive columns.

For instance, the set of LEDs {LED(c, r), c=0, 1, . . . , N−1, r=0, 1, . . . , M−1} may be divided into G groups by row, wherein G is an integer greater than 2 and smaller than M. The M products N driving modules {DRV(c, r), c=0, 1, . . . , N−1, r=0, 1, . . . , M−1} are configured to drive the G groups of LEDs ON successively group by group with the programmed delay time td between every two successive groups. For each one of the G groups, the M products N driving modules {DRV(c, r), c=0, 1, . . . , N−1, r=0, 1, . . . , M−1} are configured to drive the LESs ON successively row by row with the programmed delay time td between every two successive rows in each one of the G groups. For each row r in each one of the G groups, the driving module DRV(c+1, r) is configured to drive the LED(c+1, r) ON after the driving module DRV(c, r) has driven the LED(c, r) ON for the programmed delay time td, for each c=0, 1, . . . , N−1.

Figure 2:
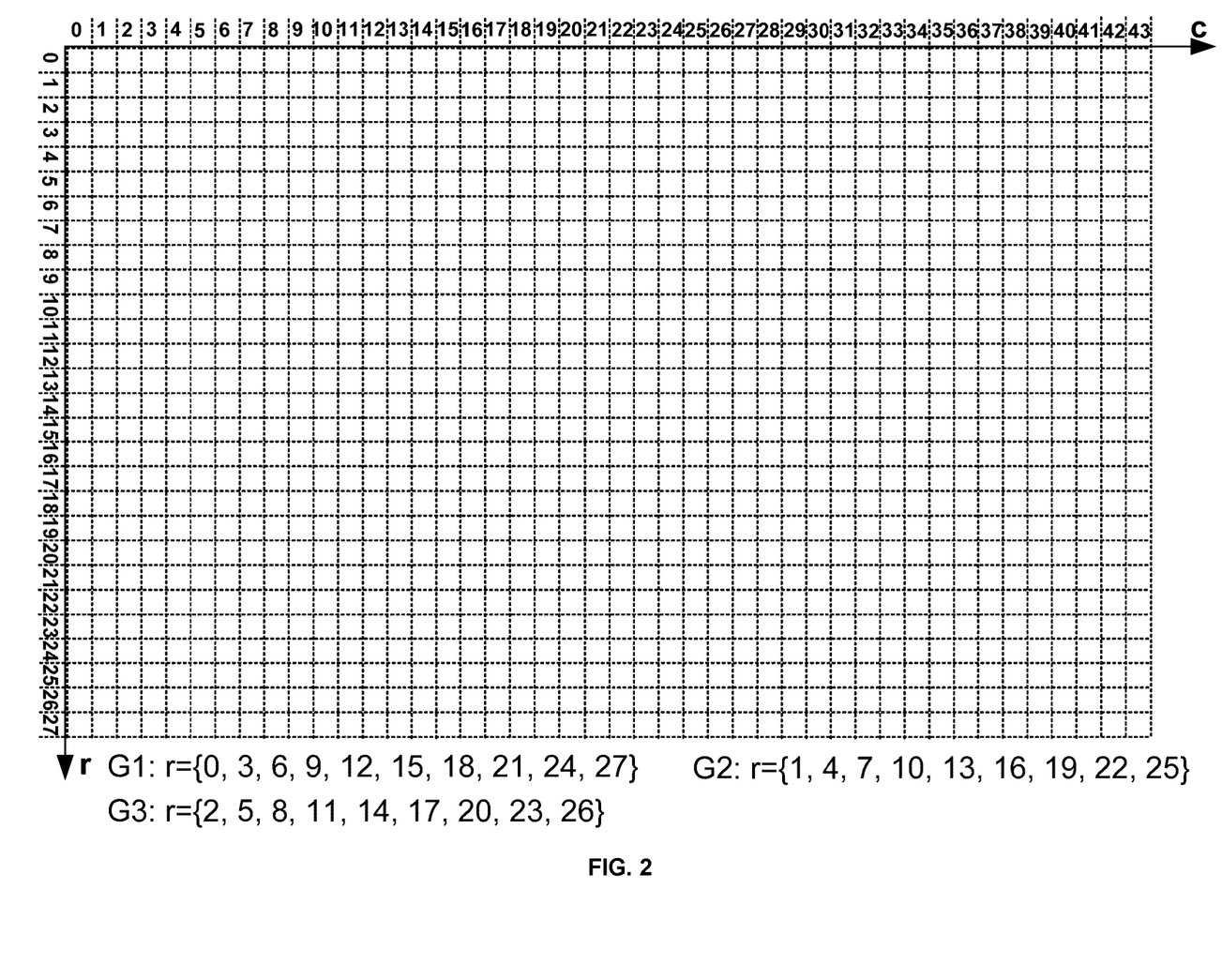
FIG. 2 illustrates a LED matrix of 28 rows and 44 columns in accordance with an embodiment of the present invention.
Figure 3:
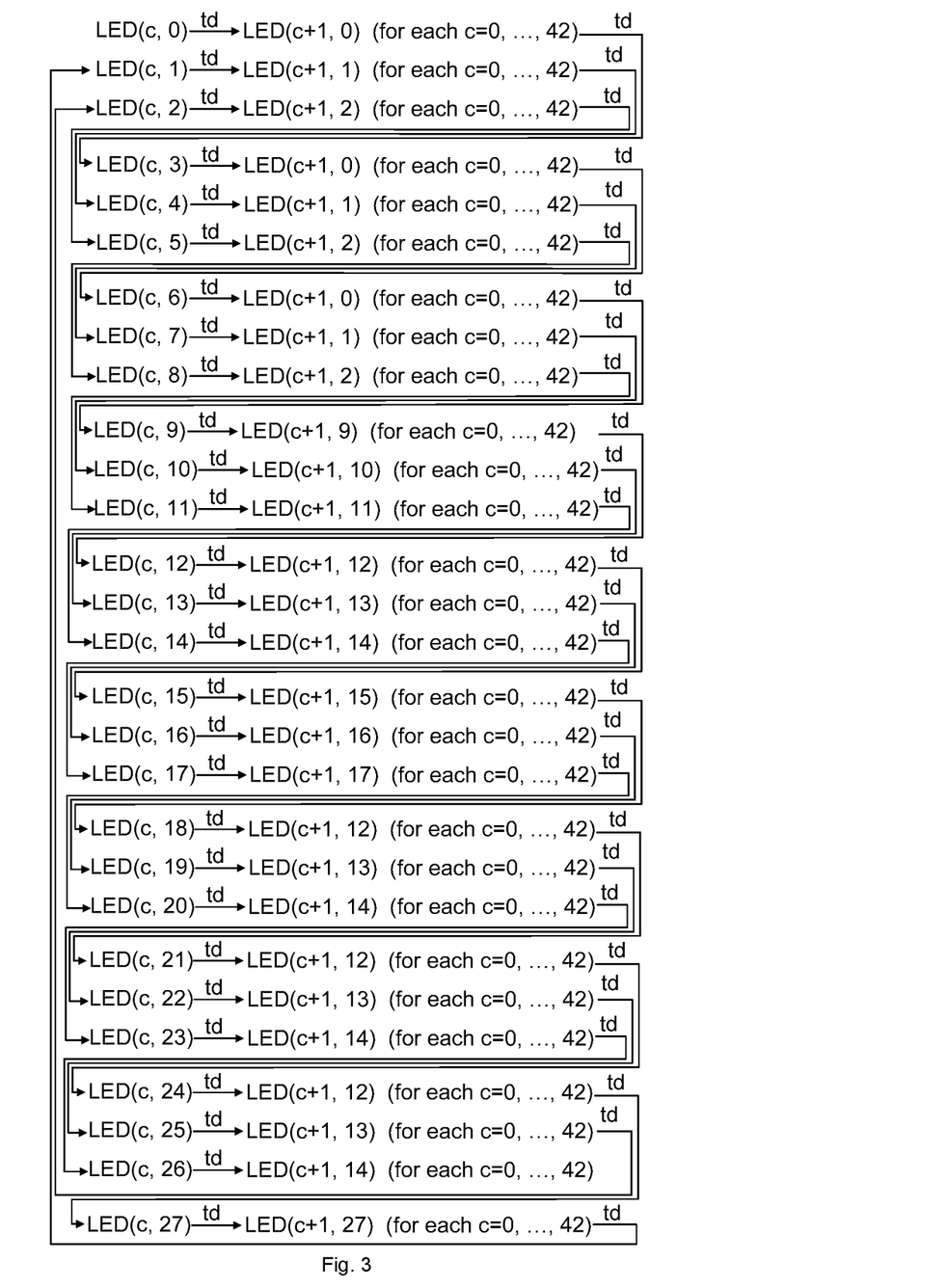
FIG. 3 illustrates an exemplary drive-on pattern of the LED matrix of FIG. 2 in accordance with an embodiment of the present invention.

To provide an example for helping to better understand the embodiments of the present invention, the LED matrix may be of 28 rows and 44 columns, as illustrated in FIG. 2, i.e., M=28, N=44. Correspondingly, there may be 28*44 driving modules also arranged in 28 rows and 44 columns. For each c=0, 1, . . . , 27 and r=0, 1, . . . , 43, the driving module DRV(c, r) is configured to drive the corresponding one LED(c, r). In an exemplary embodiment, the LED matrix of 28 rows and 44 columns may be divided into 3 groups G1, G2 and G3 by row, i.e. G=3. As shown in FIG. 2, the first group G1 may include rows r={0, 3, 6, 9, 12, 15, 18, 21, 24, 27}, the second group G2 may include rows r={1, 4, 7, 10, 13, 16, 19, 22, 25}, and the third group G3 may include rows r={2, 5, 8, 11, 14, 17, 20, 23, 26}. In an exemplary embodiment, the driving modules {DRV(c, r), c=0, 1, . . . , 43, r=0, 1, . . . , 27} may be configured to drive the LEDs in the first group G1 ON at the first place, then to drive the LEDs in the second group G2 ON after all the LEDs in the first group G1 are driven ON, and then to drive the LEDs in the third group G3 ON after all the LEDs in the second group G2 are driven ON. FIG. 3 illustrates an exemplary drive-on pattern.

Referring to FIG. 3, for the first group G1, the LEDs in the rows r={0, 3, 6, 9, 12, 15, 18, 21, 24, 27} are driven ON successively row by row and the LEDs in each row are driven ON successively column by column. For example, the LEDs in the row r=0 are driven ON at the first place column by column, i.e. for each c=0, . . . , 42, the LED(c+1, 0) is driven ON immediately after the LED(c, 0) has been driven ON for the programmed delay time td. The LED(0, 0) in the row r=0 and in the column c=0 is driven ON without any delay. After all the 44 LEDs in the row r=0 have been successively driven ON column by column, the LEDs in the row r=3 are driven ON in the same manner, i.e. for each c=0, . . . , 42, the LED(c+1, 3) is driven ON immediately after the LED(c, 3) has been driven ON for the programmed delay time td. The LED (0, 3) is driven ON after the LED(43, 0) has been driven ON for the programmed delay time td. For the LEDs in the row r=6, the LED (0, 6) is driven ON after the LED(43, 3) has been driven ON for the programmed delay time td, and for each c=0, . . . , 42, the LED(c+1, 6) is driven ON immediately after the LED(c, 6) has been driven ON for the programmed delay time td. For the LEDs in the row r=9, the LED (0, 9) is driven ON after the LED(43, 6) has been driven ON for the programmed delay time td, and for each c=0, . . . , 42, the LED(c+1, 9) is driven ON immediately after the LED(c, 9) has been driven ON for the programmed delay time td. For the LEDs in the row r=12, the LED (0, 12) is driven ON after the LED(43, 9) has been driven ON for the programmed delay time td, and for each c=0, . . . , 42, the LED(c+1, 12) is driven ON immediately after the LED(c, 12) has been driven ON for the programmed delay time td. For the LEDs in the row r=15, the LED (0, 15) is driven ON after the LED(43, 12) has been driven ON for the programmed delay time td, and for each c=0, . . . , 42, the LED(c+1, 15) is driven ON immediately after the LED(c, 15) has been driven ON for the programmed delay time td. For the LEDs in the row r=18, the LED (0, 18) is driven ON after the LED(43, 15) has been driven ON for the programmed delay time td, and for each c=0, . . . , 42, the LED(c+1, 18) is driven ON immediately after the LED(c, 18) has been driven ON for the programmed delay time td. For the LEDs in the row r=21, the LED(0, 21) is driven ON after the LED(43, 18) has been driven ON for the programmed delay time td, and for each c=0, . . . , 42, the LED(c+1, 21) is driven ON immediately after the LED(c, 21) has been driven ON for the programmed delay time td. For the LEDs in the row r=24, the LED (0, 24) is driven ON after the LED(43, 21) has been driven ON for the programmed delay time td, and for each c=0, . . . , 42, the LED(c+1, 24) is driven ON immediately after the LED(c, 24) has been driven ON for the programmed delay time td. For the LEDs in the row r=27, the LED(0, 27) is driven ON after the LED(43, 24) has been driven ON for the programmed delay time td, and for each c=0, . . . , 42, the LED(c+1, 27) is driven ON immediately after the LED(c, 27) has been driven ON for the programmed delay time td.

After all the LEDs in the first group G1 have been turned ON, the driving modules DRV(c, r) may start to drive the LEDs in the second group G2 ON successively row by row for the rows r={1, 4, 7, 10, 13, 16, 19, 22, 25} and the LEDs in each row are driven ON successively column by column. For example, for the LEDs in the row r=1, the LED (0, 1) is driven ON after the LED(43, 27) has been driven ON for the programmed delay time td, and for each c=0, . . . , 42, the LED(c+1, 1) is driven ON immediately after the LED(c, 1) has been driven ON for the programmed delay time td. For the LEDs in the row r=4, the LED (0, 4) is driven ON after the LED(43, 1) has been driven ON for the programmed delay time td, and for each c=0, . . . , 42, the LED(c+1, 4) is driven ON immediately after the LED(c, 4) has been driven ON for the programmed delay time td. For the LEDs in the row r=7, the LED(0, 7) is driven ON after the LED(43, 4) has been driven ON for the programmed delay time td, and for each c=0, . . . , 42, the LED(c+1, 7) is driven ON immediately after the LED(c, 7) has been driven ON for the programmed delay time td. For the LEDs in the row r=10, the LED(0, 10) is driven ON after the LED(43, 7) has been driven ON for the programmed delay time td, and for each c=0, . . . , 42, the LED(c+1, 10) is driven ON immediately after the LED(c, 10) has been driven ON for the programmed delay time td. For the LEDs in the row r=13, the LED (0, 13) is driven ON after the LED(43, 10) has been driven ON for the programmed delay time td, and for each c=0, . . . , 42, the LED(c+1, 13) is driven ON immediately after the LED(c, 13) has been driven ON for the programmed delay time td. For the LEDs in the row r=16, the LED(0, 16) is driven ON after the LED(43, 13) has been driven ON for the programmed delay time td, and for each c=0, . . . , 42, the LED(c+1, 16) is driven ON immediately after the LED(c, 16) has been driven ON for the programmed delay time td. For the LEDs in the row r=19, the LED (0, 19) is driven ON after the LED(43, 16) has been driven ON for the programmed delay time td, and for each c=0, . . . , 42, the LED(c+1, 19) is driven ON immediately after the LED(c, 19) has been driven ON for the programmed delay time td. For the LEDs in the row r=22, the LED(0, 22) is driven ON after the LED(43, 19) has been driven ON for the programmed delay time td, and for each c=0, . . . , 42, the LED(c+1, 22) is driven ON immediately after the LED(c, 22) has been driven ON for the programmed delay time td. For the LEDs in the row r=25, the LED(0, 25) is driven ON after the LED(43, 23) has been driven ON for the programmed delay time td, and for each c=0, . . . , 42, the LED(c+1, 25) is driven ON immediately after the LED(c, 25) has been driven ON for the programmed delay time td.

After all the LEDs in the second group G2 have been turned ON, the driving modules DRV(c, r) may start to drive the LEDs in the third group G3 ON successively row by row for the rows r={2, 5, 8, 11, 14, 17, 20, 23, 26} and the LEDs in each row are driven ON successively column by column. For example, for the LEDs in the row r=2, the LED (0, 2) is driven ON after the LED(43, 25) has been driven ON for the programmed delay time td, and for each c=0, . . . , 42, the LED(c+1, 2) is driven ON immediately after the LED(c, 2) has been driven ON for the programmed delay time td. For the LEDs in the row r=5, the LED (0, 5) is driven ON after the LED(43, 2) has been driven ON for the programmed delay time td, and for each c=0, . . . , 42, the LED(c+1, 5) is driven ON immediately after the LED(c, 5) has been driven ON for the programmed delay time td. For the LEDs in the row r=8, the LED (0, 8) is driven ON after the LED(43, 5) has been driven ON for the programmed delay time td, and for each c=0, . . . , 42, the LED(c+1, 8) is driven ON immediately after the LED(c, 8) has been driven ON for the programmed delay time td. For the LEDs in the row r=11, the LED (0, 11) is driven ON after the LED(43, 8) has been driven ON for the programmed delay time td, and for each c=0, . . . , 42, the LED(c+1, 11) is driven ON immediately after the LED(c, 11) has been driven ON for the programmed delay time td. For the LEDs in the row r=14, the LED (0, 14) is driven ON after the LED(43, 11) has been driven ON for the programmed delay time td, and for each c=0, . . . , 42, the LED(c+1, 14) is driven ON immediately after the LED(c, 14) has been driven ON for the programmed delay time td. For the LEDs in the row r=17, the LED(0, 17) is driven ON after the LED(43, 14) has been driven ON for the programmed delay time td, and for each c=0, . . . , 42, the LED(c+1, 17) is driven ON immediately after the LED(c, 17) has been driven ON for the programmed delay time td. For the LEDs in the row r=20, the LED (0, 20) is driven ON after the LED(43, 17) has been driven ON for the programmed delay time td, and for each c=0, . . . , 42, the LED(c+1, 20) is driven ON immediately after the LED(c, 20) has been driven ON for the programmed delay time td. For the LEDs in the row r=23, the LED(0, 23) is driven ON after the LED(43, 20) has been driven ON for the programmed delay time td, and for each c=0, . . . , 42, the LED(c+1, 23) is driven ON immediately after the LED(c, 23) has been driven ON for the programmed delay time td. For the LEDs in the row r=26, the LED(0, 26) is driven ON after the LED(43, 23) has been driven ON for the programmed delay time td, and for each c=0, . . . , 42, the LED(c+1, 26) is driven ON immediately after the LED(c, 26) has been driven ON for the programmed delay time td.

In this manner, all the LEDs in the three groups G1, G2 and G3 are turned ON successively group by group and in each one of the groups row by row. Large turn ON inrush current can be evitable. Better current distribution and fewer mismatches between LEDs in the LED matrix may be achieved. One of ordinary skill in the art should understand that the drive-on pattern illustrated in FIG. 3 is only illustrative and not intended to be limiting. Other drive-on pattern may be applied while the number of the groups can be changed too. When turning off the LEDs in the LED matrix, a turn-off pattern same as the drive-on pattern may be used.

Now turning back to FIG. 1, in accordance with an embodiment of the present invention, each one of the corresponding plurality of driving modules (e.g. the driving module DRV(c, r), for each c=0, 1, . . . , N−1 and r=0, 1, . . . , M−1) may comprise a local GS control module 11. The local GS control module 11 of the driving module DRV(c, r) for the LED(c, r) may have a Q-bit input terminal configured to receive the programmed grayscale command value GS(c, r) which may comprise Q bits for the LED(c, r), and may be configured to adjust the brightness of the corresponding one LED(c, r) using Q-bit grayscale command providing $2^Q$ grayscale adjusting steps so as to adjust the brightness of the corresponding one LED(c, r) to be determined by the ratio of the programmed grayscale command value GS(c, r) to $2^Q$, i.e. GS(c, r)/$2^Q$.

In accordance with an embodiment of the present invention, for each c=0, 1, . . . , N−1 and r=0, 1, . . . , M−1, the local GS control module 11 of the driving module DRV(c, r) for the corresponding one LED(c, r) may comprise: a clock input terminal configured to receive a clock signal CLK_HF having a high frequency (e.g. 65 MHZ), a local Q-bit GS command register GSR(c, r) and a local Q-bit GS counter GSC(c, r). The local Q-bit GS command register GSR(c, r) may be configured to receive and refresh the programmed grayscale command value GS(c, r) for the corresponding one LED(c, r) by every Y dimming frames, wherein Y is an integer greater than 0 and smaller. One dimming frame may be defined as lasting for $2^Q$ cycles of the clock signal CLK_HF. The local Q-bit GS command register GSR(c, r) may be further configured to transfer the programmed grayscale command value GS(c, r) for the corresponding one LED(c, r) of a current Y dimming frames to the local Q-bit counter GSC(c, r), and further configured to clear the programmed grayscale command value GS(c, r) for the corresponding one LED(c,r) of the current Y dimming frames once the programmed grayscale command value GS(c, r) for the corresponding one LED(c, r) of the current Y dimming frames is transferred to the local Q-bit counter GSC(c, r) to receive the programmed grayscale command value GS(c, r) for the corresponding one LED(c, r) of a next Y dimming frames. The local Q-bit counter GSC(c, r) may be configured to receive and store the programmed grayscale command value GS(c, r) for the corresponding one LED(c, r) of the current Y dimming frames, and to decrease the programmed grayscale command value GS(c, r) for the corresponding one LED(c, r) of the current Y dimming frames by counting down by one at each cycle of the clock signal CLK_HF until the local Q-bit counter GSC(c,r) counts to 0.

In accordance with an embodiment of the present invention, the local Q-bit counter GSC(c, r) which corresponds to the corresponding one LED(c, r) is configured to start counting down once the programmed delay time td between the corresponding one LED(c, r) and the LED immediately ON before the corresponding one LED(c, r) expires. To provide an example, if the LED driving system 10 uses the drive-on pattern as shown in FIG. 3, for the LEDs in the row r=0 in the first group G1, the local Q-bit counter GSC(0, 0) to the corresponding one LED(0, 0) may be configured to start counting down without any delay, and for each c=0, . . . , 42, the local Q-bit counter GSC(c+1, 0) to the corresponding one LED(c+1, 0) is configured to start counting down once the programmed delay time td between the corresponding one LED(c+1, 0) and the LED(c, 0) which was driven ON immediately before the corresponding one LED(c+1, 0) expires.

In accordance with an embodiment of the present invention, since the programmed grayscale command value GS(c, r) for the corresponding one LED(c, r) is refreshed by every Y dimming frames, to avoid scenarios in which the accumulated delay time for driving ON all the LEDs in the LED matrix overruns the Y dimming frames, the selection of the programmed delay time td should meet the condition that a sum of the programmed delay time between every two LEDs that are successively driven ON for all the plurality of LEDs is shorter than the Y dimming frames. For instance, for the LED matrix of M rows and N columns, the programmed delay time td should meet the following expression (2) wherein $T_{CLK\_HF}$ is the period of the clock signal CLK_HF:

$$(M*N-1)*td < Y*2^Q*T_{CLK\_HF} \qquad (2)$$

In accordance with an embodiment of the present invention, the programmed delay time td may be programmed to a positive integer PI multiples of the period $T_{CLK\_HF}$ of the clock signal CLK_HF. In an exemplary embodiment, the positive integer PI may be programmed by an F-bit delay time programming register 13, having an F-bit input terminal configured to receive the positive integer PI in F-bit and to transfer the positive integer PI in F-bit to the M products N driving modules {DRV(c, r), c=0, 1, . . . , N−1, r=0, 1, . . . , M−1}, wherein F is an integer equal to or greater than 0, The F-bit delay time programming register 13 may provide $2^F$ adjusting steps for the programmed delay time td. Based on the above expression (2), it is easy to choose the positive integer PI value and the F value according to practical application requirements. For instance, in the example of M=28, N=44, Q=16, $T_{CLK\_HF}$=1/65 µs, Y=1, if user wants to refresh the programmed grayscale command values GS(c, r) for all the 28*44 LEDs within 1 ms, the maximum programmed delay time td between every two successively ON/OFF LEDs available for user to choose may be about 811 ns (td=1 ms/(28*44)≈811 ns), which is about 52 multiples of the period $T_{CLK\_HF}$ of the clock signal CLK_HF. Thus, user may set the positive integer PI to be smaller or equal to 52. If PI=52, user may choose the F value to be at least 6, i.e. at least a 6-bit delay time programming register is needed. To provide enough adjusting steps for the programmed delay time td, an 8-bit (i.e. F=8) delay time programming register which provides $2^8$=256 adjusting steps for the programmed delay time td may be used.

In accordance with an embodiment of the present invention, each one of the corresponding plurality of driving modules (e.g. the driving module DRV(c, r), for each c=0, 1, . . . , N−1 and r=0, 1, . . . , M−1) may further comprise a local driving circuit 12. For each c=0, 1, . . . , N−1 and r=0, 1, . . . , M−1, the local driving circuit 12 for the corresponding one LED(c, r) may comprise a local driver 121(*c, r*) coupled to the output of the local GS control module 11 and to provide a local driving signal to a local power switch 122(*c, r*) to control the on and off switching of the local power switch 122(*c, r*), and consequently to control the ON and OFF as well as the grayscale of the corresponding one LED(c, r).

In accordance with an embodiment of the present invention, the local driving circuit 12 for the corresponding one LED(c, r) may further comprise a local delay circuit 123(*c, r*) configured to receive the positive integer PI from the F-bit delay time programming register 13 and the clock signal CLK_HF to provide the programmed delay time td related to the corresponding one LED(c, r), for each c=0, 1, . . . , N−1 and r=0, 1, . . . , M−1 except the one LED that is turned ON at the beginning of every Y dimming frames. For instance, in the example of the 28*44 LED matrix using the drive-on pattern shown in FIG. 3, the local driving circuit 12 for the LED(0, 0) does not need to include a local delay circuit.

In accordance with an embodiment of the present invention, still referring to FIG. 1, the LED matrix driving system 10 may further comprise a low voltage differential signaling ("LVDS") module 14. The LVDS module 14 may have a clock differential pin pair (S_CLK+, S_CLK−), a data receive differential pin pair (DT_RCV+, DT_RCV−) and a data return differential pin pair (DT_RTN+, DT_RTN−). The LVDS module 14 may be configured to stream data exchange between a master controller (e.g. a microcontroller, a central processing unit etc.) and the LED matrix driving system 10.

Figure 4:
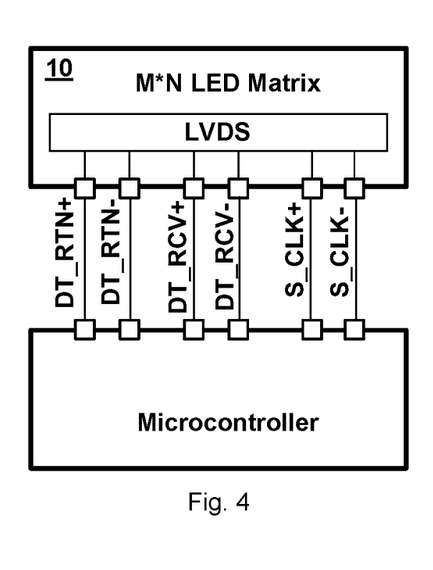
FIG. 4 illustrates a block diagram showing a LED matrix driving system 10 coupled to a microcontroller in accordance with an embodiment of the present invention.

FIG. 4 illustrates a block diagram showing a LED matrix driving system 10 coupled to a microcontroller. The clock differential pin pair (S_CLK+, S_CLK−) may be configured to receive a system clock signal S_CLK from the master controller. The system clock signal S_CLK may synchronize the data read and write between the master controller and the LED matrix driving system 10. The data receive differential pin pair (DT_RCV+, DT_RCV−) may be configured to read in programmed data such as the programmed grayscale command value GS(c, r) for each LED in the LED matrix, the programmed positive integer PI for programming the programmed delay time td etc. from the master controller. The data return differential pin pair may be configured to send feedback data from the LED matrix driving system 10 to the master controller.

In accordance with an embodiment of the present invention, the local Q-bit grayscale command register GSR(c, r) in each one of the plurality of driving modules DRV(c, r) (for each c=0, . . . , N−1, r=0, . . . , M−1) has a unique preset address composed of J-bit column address and K-bit row address, and wherein J is an integer greater than 1 and depending on the number (i.e. N) of columns of the LED matrix, and wherein K is an integer greater than 1 and depending on the number (i.e. M) of rows of the LED matrix. The integer J should satisfy the expression of $2^J \geq N$ while the integer K should satisfy the expression of $2^K \geq M$. For instance, in the example of the LED matrix of 28 rows and 44 columns as shown in FIG. 2, the local Q-bit grayscale command registers GSR(c, r) for each c=0, . . . , N−1, r=0, . . . , M−1 may have a unique preset address composed of 6-bit column address (i.e. J=6) and 5-bit row address (i.e. K=5).

The LVDS module 14 may be configured to write the programmed grayscale command value GS(c, r) into the local Q-bit grayscale command register GSR(c, r) for the corresponding one LED(c, r) by identifying the unique preset address of the local Q-bit grayscale command register GSR(c, r), for each c=0, . . . , N−1, r=0, . . . , M−1.

One of ordinary skill in the art would understand that in alternative embodiments, the LED matrix driving system 10 may comprise a plurality of LED driving sections coupled in parallel, wherein each LED driving section may comprise the LED matrix {LED(c, r), c=0, 1, . . . , N−1, r=0, 1, . . . , M−1} of M rows and N columns, the corresponding M products N driving modules {DRV(c, r), c=0, 1, . . . , N−1, r=0, 1, . . . , M−1}, and the LVDS 14 as described in this disclosure. For instance, FIG. 1 shows an example of Z LED driving sections coupled in parallel, wherein Z is an integer greater than 1. The advantages of the various embodiments of the present invention are not confined to those described above. These and other advantages of the various embodiments of the present invention will become more apparent upon reading the whole detailed descriptions and studying the various figures of the drawings.

From the foregoing, it will be appreciated that specific embodiments of the present invention have been described herein for purposes of illustration, but that various modifications may be made without deviating from the technology. Many of the elements of one embodiment may be combined with other embodiments in addition to or in lieu of the elements of the other embodiments. Accordingly, the present invention is not limited except as by the appended claims.

What is claimed is:

1. A LED driving system for a LED matrix having a plurality of LEDs connected in parallel, comprising:
a plurality of driving modules, wherein each one of the plurality of driving modules is configured to drive a corresponding one of the plurality of LEDs; and
wherein the plurality of LEDs are divided into a plurality of groups; and
wherein the plurality of driving modules are configured to drive the plurality of LEDs ON successively group by group, and
wherein for each one of the plurality of groups, the plurality of driving modules are configured to drive the LEDs ON successively row by row, and
wherein for each row in each one of the plurality of groups, the plurality of driving modules are configured to drive the LEDs ON successively column by column with a programmed delay time between the LEDs in every two successively ON columns;
and wherein the brightness of the corresponding one LED is determined by a ratio of a programmed grayscale command value for the corresponding one LED to $2^Q$ and wherein Q is an integer greater than 0, and wherein the programmed grayscale command value ranges from 0 to 2Q; and
wherein each one of the plurality of driving modules comprises a local grayscale control module for adjusting the brightness of the corresponding one LED using Q-bit grayscale command providing 2Q grayscale adjusting steps, wherein the local grayscale control module has a Q-bit input terminal configured to receive the programmed grayscale command value for the corresponding one LED, and wherein the local grayscale control module is configured to adjust the brightness of the corresponding one LED to be determined by a ratio of the programmed grayscale command value to 2Q, and wherein Q is an integer greater than 0, and wherein the programmed grayscale command value ranges from 0 to $2^Q$; and
wherein the local grayscale control module for the corresponding one LED comprises:
a clock input terminal configured to receive a clock signal;
a local Q-bit grayscale command register, configured to receive and refresh the programmed grayscale command value for the corresponding one LED by every Y dimming frames, wherein Y is an integer greater than 0, and wherein one dimming frame lasts for $2^Q$ cycles of the clock signal, and wherein the local Q-bit grayscale command register is further configured to transfer the programmed grayscale command value for the corresponding one LED of a current Y dimming frames to a local Q-bit counter, and further configured to clear the programmed grayscale command value for the corresponding one LED of the current Y dimming frames once the programmed grayscale command value for the corresponding one LED of the current Y dimming frames is transferred to the local Q-bit counter to receive the programmed grayscale command value for the corresponding one LED of a next Y dimming frames; and the local Q-bit counter, configured to receive and store the programmed grayscale command value for the corresponding one LED of the current Y dimming frames, and to decrease the programmed grayscale command value for the corresponding one LED of the current Y dimming frames by counting down by one at each cycle of the clock signal until the local Q-bit counter counts to 0.

2. The LED driving system of claim 1, wherein the programmed delay time is a positive integer multiples of a period of a clock signal.

3. The LED driving system of claim 2, further comprising:
an F-bit delay time programming register, having an F-bit input terminal configured to receive the positive integer in F-bit and to transfer the positive integer in F-bit to the plurality of driving modules, wherein F is an integer equal to or greater than 0.

4. The LED driving system of claim 1, wherein each one of the plurality of driving modules for driving the corresponding one of the plurality of LEDs comprises:

a local delay circuit, configured to provide the programmed delay time related to the corresponding one of the plurality of LEDs.

5. The LED driving system of claim 1, wherein the local Q-bit counter is configured to start counting down once the programmed delay time between the corresponding one LED and the LED immediately ON before the corresponding one LED expires.

6. The LED driving system of claim 1, wherein a sum of the programmed delay time between every two successively ON LEDs for all the plurality of LEDs is shorter than the Y dimming frames.

7. The LED driving system of claim 1, wherein the local Q-bit grayscale command register in each one of the plurality of driving modules has a unique preset address composed of J-bit column address and K-bit row address, and wherein J is an integer greater than 1 and depending on the number of columns of the LED matrix, and wherein K is an integer greater than 1 and depending on the number of rows of the LED matrix.

8. The LED driving system of claim 7, further comprising:
a low voltage differential signaling module, configured to write the programmed grayscale command value into the local Q-bit grayscale command register for the corresponding one LED by identifying the unique preset address of the local Q-bit grayscale command register.

* * * * *